United States Patent [19]
Dresselhuys et al.

[11] Patent Number: 5,659,300
[45] Date of Patent: Aug. 19, 1997

[54] METER FOR MEASURING VOLUMETRIC CONSUMPTION OF A COMMODITY

[75] Inventors: Donn R. Dresselhuys, Shorewood; Kimbel Nap, Glendale; Lance A. Ehrke, Shorewood, all of Wis.

[73] Assignee: Innovatec Corporation, Milwaukee, Wis.

[21] Appl. No.: 707,945

[22] Filed: Sep. 10, 1996

Related U.S. Application Data

[63] Continuation of Ser. No. 380,803, Jan. 30, 1995, abandoned.
[51] Int. Cl.$^6$ .................... G08B 23/00; G08C 15/06
[52] U.S. Cl. .................... 340/870.02; 340/870.11; 340/825.54; 73/861.78; 364/510
[58] Field of Search .................... 340/825.54, 870.02, 340/870.03, 870.05, 870.07, 870.11; 73/861.77, 861.78, 861.79; 364/510

[56] References Cited

U.S. PATENT DOCUMENTS

| 4,132,981 | 1/1979 | White | 340/203 |
|---|---|---|---|
| 4,463,354 | 7/1984 | Sears | 340/870.05 |
| 4,758,836 | 7/1988 | Scuilli | 340/870.02 |
| 4,848,164 | 7/1989 | Quarve et al. | 73/861.77 |
| 4,885,943 | 12/1989 | Tootell et al. | 364/510 |
| 4,908,600 | 3/1990 | Martinez | 340/310 R |
| 4,918,995 | 4/1990 | Pearman et al. | 73/861.02 |
| 4,940,976 | 7/1990 | Gastouniotis et al. | 340/870.02 |
| 4,953,368 | 9/1990 | Pearman et al. | 364/510 |
| 4,953,386 | 9/1990 | Pearman et al. | 73/3 |
| 4,965,756 | 10/1990 | Pearman et al. | 364/510 |
| 4,969,365 | 11/1990 | StrigArd et al. | 364/510 |
| 4,998,102 | 3/1991 | Wyler et al. | 340/870.02 |
| 5,111,407 | 5/1992 | Galpern | 340/870.02 |
| 5,126,934 | 6/1992 | MacFadyen | 364/140 |
| 5,199,307 | 4/1993 | Onoda et al. | 73/861.78 |
| 5,251,149 | 10/1993 | William et al. | 364/510 |
| 5,298,894 | 3/1994 | Cerny et al. | 340/870.02 |
| 5,372,048 | 12/1994 | Dunbar | 73/861.91 |
| 5,455,781 | 10/1995 | Reynal et al. | 364/510 |

FOREIGN PATENT DOCUMENTS

| 0255100 | 10/1989 | Japan | 340/870.02 |
|---|---|---|---|

Primary Examiner—Jeffery Hofsass
Assistant Examiner—Timothy Edwards, Jr.
Attorney, Agent, or Firm—Andrus, Sceales, Starke & Sawall

[57] ABSTRACT

Disclosed is a meter for mounting in flow-sensing relationship to a pipeline conductor or electrical line having a commodity such as water, natural gas or electricity flowing through it. In one embodiment, the meter has a transceiver inductively-coupled to a remote signal-radiating device such as a repeater antenna for sending an encoded signal to a remote receiver. Another embodiment of the meter includes a rechargeable device such as a nickel-cadmium battery for storing meter-powering electricity and a charging generator coupled to such device. The generator has a turbine driven "bootstrap fashion" by the commodity flowing through the conductor. Preferably, solid state digital technology is used for minimizing power consumption during meter operation.

14 Claims, 5 Drawing Sheets

METER FOR MEASURING VOLUMETRIC CONSUMPTION OF A COMMODITY

The present application is a continuation application of U.S. patent application, Ser. No. 08/380,803, filed Jan. 30, 1995, and now abandoned.

FIELD OF THE INVENTION

This invention relates generally to flow meters and, more particularly, to indicating meters such as used by utilities and municipalities to meter consumption of natural gas, water and electricity.

BACKGROUND OF THE INVENTION

Commodities such as natural gas, water and electricity are routinely delivered to commercial and industrial establishments and residences by piping networks or electrical lines (as the case may be) operated by utility companies and municipalities. For billing purposes, such commodities are "metered" at the point of consumption. That is, the network line or "lateral" extending to the establishment or the residence includes a meter indicating how much of the commodity has been consumed in a period of time and the commodity customer is billed accordingly.

It has been estimated that there are about 600 million utility meters installed worldwide. It has also been estimated that there are about 270 million utility meters in the United States and that about 150–160 million of those meters are used for gas and water. Only a very small percentage of utility meters are configured to be read remotely.

In fact, most such meters are read visually by a person walking on site to actually view and manually record the information displayed on the meter dial. There are a number of disadvantages to this form of meter reading. One is that it is enormously labor-intensive. The overhead costs to a utility or municipality for "walk-by" meter reading are very substantial.

Another disadvantage of such form of meter reading is that the person reading meters is subjected to various forms of hazard, e.g., deep snow, barking (and perhaps biting) dogs and the like. And it is not unheard of that a consumer intentionally keeps a ferocious dog in the hope of preventing the meter from being read.

Still another disadvantage is that property owners, especially residential owners, prefer that mater readers not walk on the property. Sometimes, there is a risk that however careful, the meter reader will trample flowers or ornamental shrubs.

In recognition of the disadvantages of walk-by meter reading, meters have been developed which can be read remotely. Such meters are configured as transponders and include a radio transmitter. When the meter is "interrogated" by a radio signal from a remote location, the meter responds by transmitting a signal encoded with the meter reading.

But such meters also have a disadvantage. They are battery-powered and when the battery charge is depleted, such batteries must be replaced. Of course, replacement is very time-consuming and significantly negates the otherwise-very-attractive advantages of remote meter reading.

Yet another disadvantage of known battery-powered meters is that they continue to use "analog" readout devices such as mechanically-driven rotating dials. The non-rechargeable batteries are used only for the transmitting function.

Still another disadvantage of some known battery-powered meters is that the transmitting equipment is in a housing separate from that containing the meter per se. An electrical cable or wiring extends between the housings and its very existence and exposure to view makes such meter subject to tampering by, e.g., cutting the cable.

(As used herein, the term "non-rechargeable" means a battery which cannot be re-charged except by removing it from the meter and replacing it with another battery. That is, a non-rechargeable battery cannot be recharged by a source of electricity integral to the meter itself.)

Another disadvantage of transponding-type meters in certain geographical areas is that the meter is mounted below-ground in a pit. The pit sometimes fills with water, immersing the meter. And the need for an electrical lead passing through the meter housing makes it much more difficult to seal such housing against the entry of water.

A new meter which addresses and resolves disadvantages of the prior art and, in particular, which eliminates the need for "hard wiring" between the meter and transmitter would be a major improvement in the art. Similarly, a new meter which extends battery life would be an important technological advance.

OBJECTS OF THE INVENTION

It is an object of the invention to provide an improved meter overcoming some of the problems and shortcomings of the prior art.

Another object of the invention is to provide an improved meter capable of being interrogated by electro-magnetic radiation.

Yet another object of the invention is to provide an improved meter which can be remotely "interrogated" for transmitting signals and which eliminates the need for a hard-wire connection between the meter and a signal-radiating device.

Another object of the invention is to provide an improved meter which can be installed in a pit and readily sealed against the entry of water, even when the meter is immersed in water.

Another object of the invention is to provide an improved meter maximizing use of solid state digital technology.

Still another object of the invention is to provide an improved battery-powered meter which significantly extends battery life and thus the operating life of the meter before maintenance is needed.

Another object of the invention is to provide an improved battery-powered meter which substantially eliminates the need to replace the battery when the initial charge is depleted.

Yet another object of the invention is to provide an improved meter which in one embodiment is free of an analog readout device. How these and other objects are accomplished will become more apparent from the following descriptions and from the drawing.

SUMMARY OF THE INVENTION

The invention involves a meter for mounting to a conductor having a commodity such as natural gas, water or electricity flowing through it. The meter has an electrically-powered transmitter and includes a rechargeable device, e.g., a nickel-cadmium battery or a capacitor, for storing electricity to power such meter transmitter. There is also a source of electricity for recharging the device. The invention thereby resolves a major drawback of earlier meters in that such invention greatly extends both the life of the power source and the meter service life. To put it another way, the new meter substantially eliminates the need to replace the battery as is the case with prior art meters when the initial battery charge is depleted or is substantially so.

In a highly preferred embodiment, the source includes a charging generator coupled to the device to charge it and having a turbine or similar flow-responsive device driven by the commodity flowing through the conductor. In a specific embodiment configured as a water meter, the flow-responsive device is a turbine in the conductor and having a driving magnet thereon. The meter includes a rotor magnetically coupled to the driving magnet and rotated thereby. In another embodiment used for remote reading of meters, the meter has an antenna for radiating an encoded signal to a remote receiver.

The charging generator has a wire-wound stator stationary in the meter and a rotor driven by the commodity flowing through the conductor. While the rotor could be of the wire-wound type, a preferred rotor is embodied as a permanent magnet or has a permanent magnet attached thereto. The rotor is mounted on a generator shaft and in a meter embodied for metering gas, the turbine (rotated by the flow of the commodity through the conductor) is also mounted on the shaft.

The new meter has extremely low "drag" and for that reason may be used with analog indicator panels. To put it another way, the drag of the new meter is a very small part of the drag imposed by the analog indicator panel itself. However, in another aspect of the invention, the meter has a digital rather than an analog indicator panel. Such digital panel has a plurality of segments used to form numerals of the digital type. Combinations of segments at each location are activated for indicating commodity flow. In a highly preferred embodiment, the segments are of the liquid crystal display (LCD) type since such LCDs use extremely low power.

When the meter is configured for remote meter reading, a highly preferred arrangement, the meter includes a radio transmitter powered by the rechargeable device. The antenna is coupled to the transmitter and when the meter is "interrogated," (triggered by an incoming radio-wave signal to transmit the then-existing meter reading), such meter radiates a signal representing totalized flow of the commodity through the conductor.

And that is not all. The new meter also includes a pulse generator emitting pulses representing flow. Preferably, such pulse generator is of solid state configuration and has a permanent magnet rotating at a rate which represents the rate of flow. A switch is periodically actuated by the magnet during magnet rotation and such switch may be a Hall-effect transistor or a reed switch, for example.

(As used herein, totalized flow may mean the total of flow from the date the meter was installed and "zeroed." In that event, the periodic consumption of the commodity is determined by subtracting the current "reading" of totalized flow from the immediately-preceding reading thereof. If the meter if reset to zero upon interrogation, totalized flow means the total flow from such reset to the time of interrogation.)

In yet another aspect of the invention, the housing is watertight and the transmitter and antenna are confined in such housing. There are no electricity-carrying wires extending between the interior and the exterior of such housing. That is, the exterior of the housing is free of such wires and the meter may therefore be placed in a moist environment. When the meter is "interfaced" with a wireless system such as a cellular telephone (or other type of telephonic system) or with a vehicle carrying a transmitter and receiver, the housing is preferably made of a material, e.g., plastic or the like, which is permeable to electromagnetic radiation (EMR).

Another embodiment of the meter is particularly useful in areas where the meter is mounted in a pit. The meter includes an RF transceiver, a totalizing circuit board, a liquid crystal display and an antenna, all within the meter housing. A signal-radiating device such as a repeater antenna is spaced from the meter antenna and inductively-coupled to it. The meter is thereby free of wiring connecting the antenna and the device and the meter housing may be readily sealed for water exclusion.

More specifically, the signal-radiating device includes a pickup lead extending downwardly from it. Such lead terminates in a signal-coupling loop spaced from and in signal-coupling proximity to the antenna. The exterior of the meter housing is free of wires carrying electricity. In other words, there are no wires passing between the housing interior and exterior.

Therefore, the housing is substantially tamper-proof and readily made watertight for withstanding a moist environment. Such housing is also permeable to EMR so that electromagnetic radiation can pass between the interior transceiver antenna and the exterior repeater antenna.

In another aspect of the invention using the remote signal-radiating device, the conductor carrying the metered commodity has a flow sensor in it or associated with it. Such sensor has an output device providing a flow-related signal, i.e., a signal from which flow can be ascertained. In a specific embodiment, the output device includes one or more magnets attached to and rotating with a sensor turbine.

The meter has a sensing unit in signal-sensing relationship to the output device and the sensing unit has a component for sensing the flow-related signal from the output device. When such output device includes a magnet, the component may be a Hall-effect transistor, for example, to sense changes in the electromagnetic field of the magnet.

A common type of gas meter has a mechanical coupling extending from the gas meter enclosure. In conventional usage, such coupling is used to drive an analog readout dial.

Another embodiment of the new meter is particularly useful for measuring volumetric consumption of a gaseous commodity flowing through the gas meter enclosure. In the invention, the mechanical coupling is equipped with an output device providing a flow-related signal. Where the output device includes a magnet, a component of the meter sensing unit may be a Hall-effect transistor as mentioned above. The availability of the mechanical coupling on a conventional meter and the ease with which the analog readout dial hardware can be removed makes this version of the meter particularly attractive for retrofitting existing conventional gas meters.

Preferably, the transceiver and the totalizing circuit board are solid-state digital devices. Such devices, like the liquid crystal display, use very low power. And with such low power consumption, the new meter operates for extended periods, even without using a rechargeable battery.

Further details of the invention are set forth in the following detailed description and in the drawing.

DETAILED DESCRIPTION OF PREFERRED EMBODIMENTS

Figure 1:
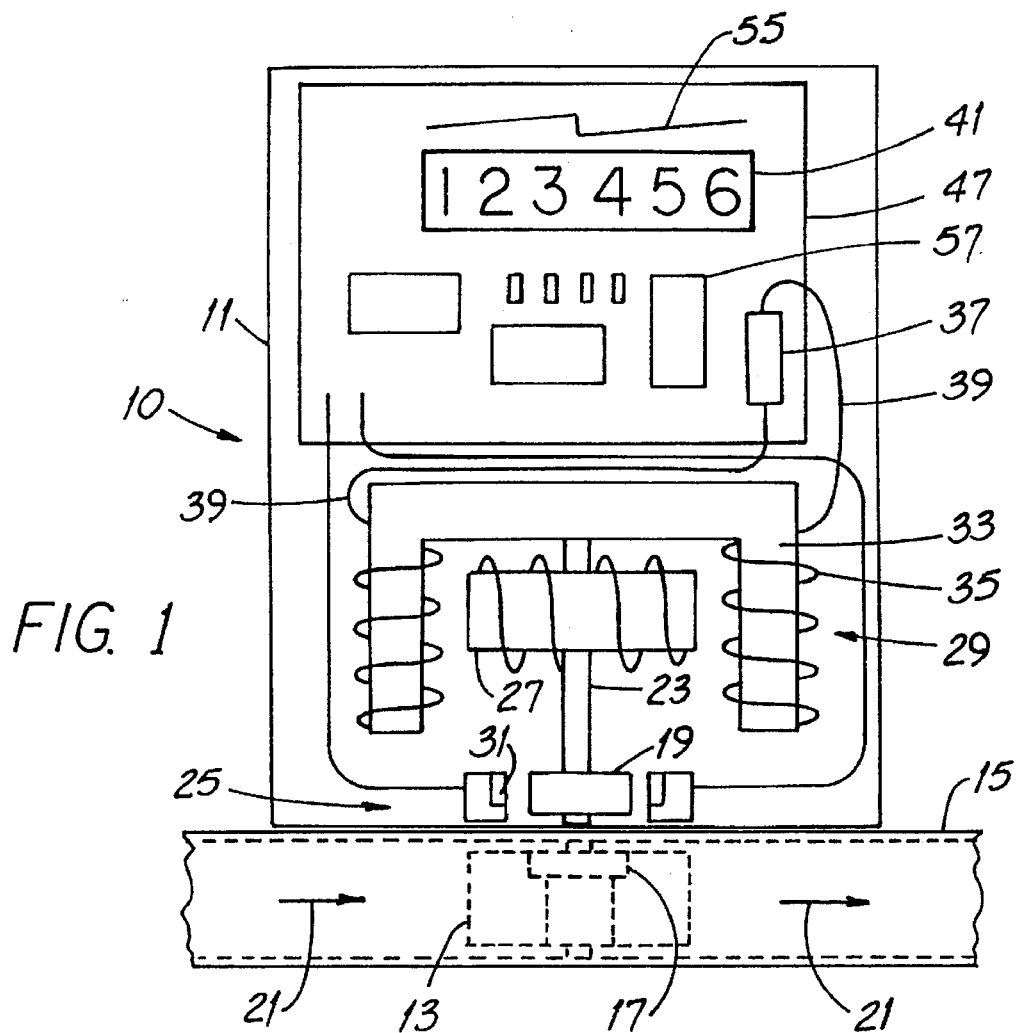
FIG. 1 is an elevation view in phantom of one embodiment of the new commodity meter shown in conjunction with a fluid conductor. Parts are broken away and surfaces of parts are shown in dashed outline.

Referring first to FIG. 1, the first embodiment of the new meter 10 is particularly well suited for water metering and has a housing 11 in which meter components are mounted. A turbine 13 is mounted in the pipeline or conductor 15 for rotation when water (or some other commodity) flows through such conductor 15. Such turbine 13 has a driving magnet 17 mounted thereon and such magnet 17 is magnetically-coupled (but not mechanically-coupled) to the rotor 19 described below. The rate of rotation of the turbine 13 is generally proportional to the rate at which the commodity (represented by the arrows 21) flows through the conductor 15.

That part of the meter 10 outside the conductor 15 has an upwardly-extending rotatable shaft 23 on which is mounted the rotor 19 of a pulse generator 25 for measuring volumetric flow. The rotor 27 of an electrical generator 29 comprising a source of battery-charging electricity is also mounted on and rotates with such shaft 23.

The pulse generator 25 emits pulses representing flow and in a highly preferred embodiment, the rotor 19 of such generator 25 is a permanent magnet or has one or two permanent magnets attached thereto. Such generator 25 also has one or two switches 31 actuated each time a magnet passes in close proximity thereto. An exemplary switch 31 is embodied as a magnetically-actuated reed switch or as a Hall-effect transducer.

Considering the electrical generator 29, its rotor 27 may be of the wire-wound type as shown but more preferably (to avoid the use of commutators), such rotor 27 is a permanent magnet rotating with the turbine 13 and the pulse generator rotor 19. The electrical generator 29, also has a wire-wound stator 33 and during rotation of the rotor 27, the stator winding 35 "cuts" lines of magnetic flux, thereby generating electricity.

The meter 10 also has a rechargeable device 37 such as a nickel-cadmium battery or a capacitor for storing electricity to power such meter. The device 37 has appropriate charging circuitry as well as the battery or capacitor per se and the stator wires 39 are coupled to such device 37 for providing charging power.

Figure 2:
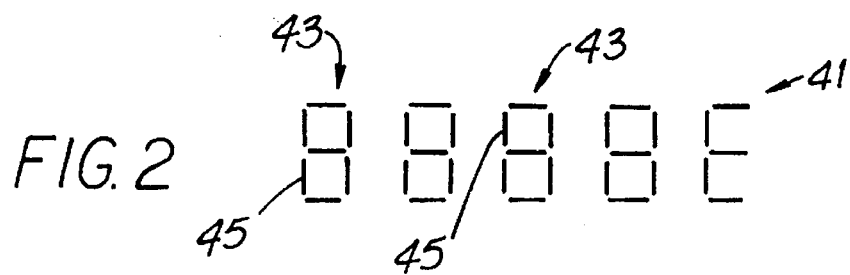
FIG. 2 is a representative view of a digital indicator panel of the liquid crystal display (LCD) type.

Referring also to FIG. 2, one embodiment of the meter 10 has a digital indicator panel 41 with a plurality of character locations 43. Each location 43 includes a plurality of segments 45 used to form numerals of the digital type and combinations of segments 45 at each location 43 are activated for indicating commodity flow. The preferred digital indicator panel 41 uses a liquid crystal display (LCD) because of its extremely low power consumption. The indicator panel 41, the rechargeable device 37 and other electrical and logic components used in the meter 10 (including those associated with transponding as described below) are mounted on a printed circuit board 47.

Figure 3:
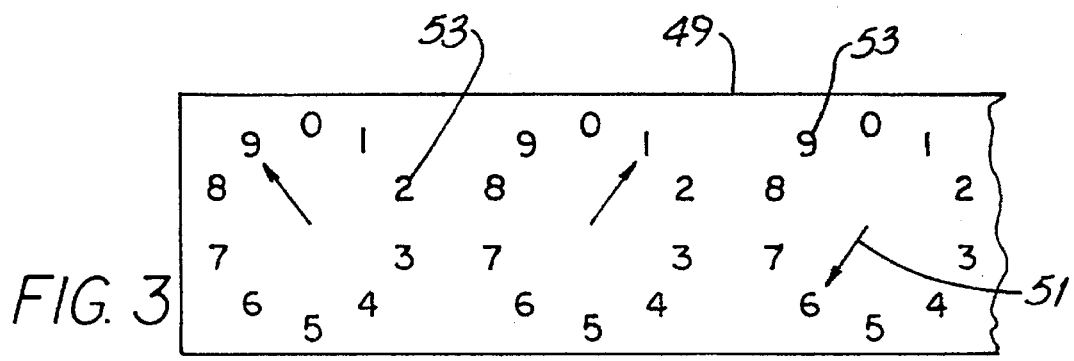
FIG. 3 is an elevation view of an analog indicator panel. Parts are broken away.

(As used herein, the term "digital indicator panel" means a panel 41 indicating commodity flow by actually forming the outline of a numeral at each of plural locations 43. This is in contrast to an analog indicator panel 49 which indicates flow by using a pointer 51 and printed numerals 53 on a background. And as indicated above, the new meter 10 may also be used with an analog indicator panel 49 as shown in FIG. 3.)

Referring again to FIG. 1, in one specific embodiment used for remote meter 10 reading, the meter has an antenna 55 for radiating an encoded signal to a remote receiver. The antenna 55 is attached to a radio transmitter 57 powered by the rechargeable device 37 and when the meter 10 is "interrogated," (triggered by an incoming radio-wave signal to transmit the then-existing meter reading), such meter 10 radiates a signal representing totalized flow of the commodity, e.g., water, gas or electricity, through the conductor 15.

Figure 4:
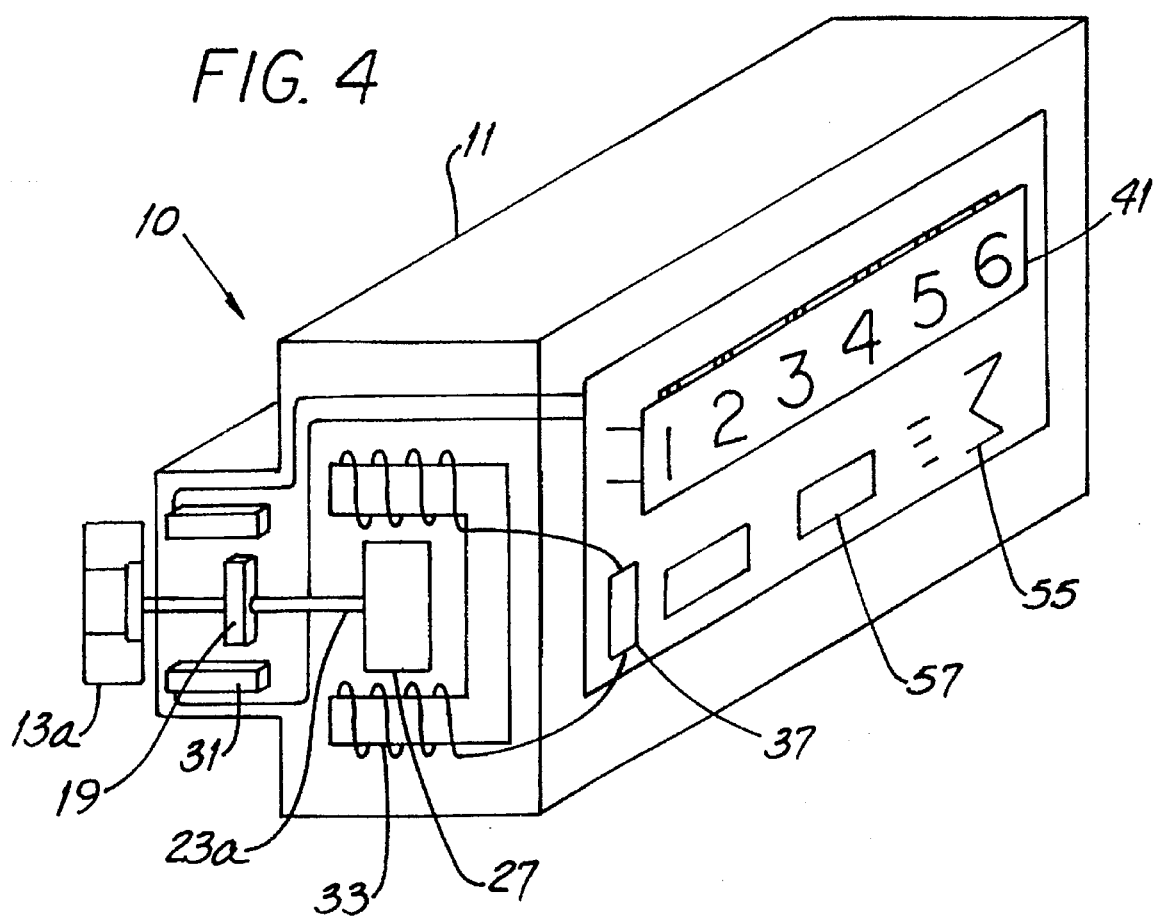
FIG. 4 is a perspective view in phantom of another embodiment of the new commodity meter.

FIG. 4 shows another embodiment of the new meter 10 which is particularly well suited for metering gas. Such meter 10 has a turbine 13a mounted on the shaft 23a for placement in a flow-receiving relationship to fluid flowing through the conductor 15.

Figure 5:
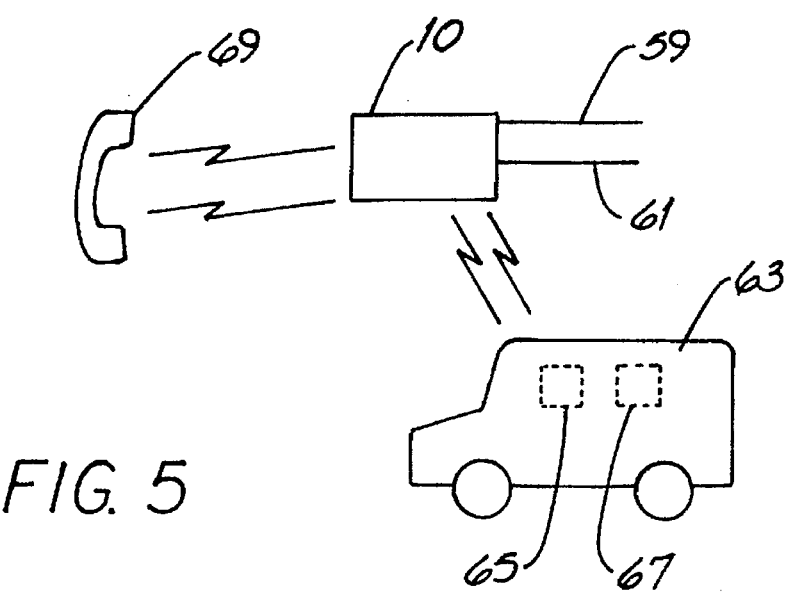
FIG. 5 is a representative view showing how the new meter can be used with telephone or power lines, with an interrogating vehicle and/or with a cellular telephone.

Considering FIG. 5, after appreciating the various features of the new meter 10, it will be apparent that there are a number of ways to obtain consumption-based information from it. One way is by on-site visual inspection of the indicator panel 41 or 49. Another way is to couple the meter output to an electrical power line 59 (if not already coupled to such power line 59) and use power line carrier (PLC) techniques to transmit the interrogation or "wake up" sign and to receive the encoded information from the meter 10.

A telephone line 61 may be used in much the same manner to send digitally-coded interrogation signals and to receive digitally-encoded flow-related information. Still other ways include using a vehicle 63 equipped with an interrogating transmitter 65 and a receiver 67. And in view of the major advances being made in cellular telephonic communications, the meter 10 may interface with a telephone 69 and its communication network.

In warmer climates prevailing in some southern parts of the United States, conventional water meters are often installed in pits. Such pits are often moist and may even flood from time to time. In yet another aspect of the invention for use in such installations, the housing 11 is watertight and the antenna 55 and the transmitter 57 are confined in such housing 11. There are no electricity-carrying wires extending between the interior and the exterior of such housing 11. That is, the transmitter 57 is within the same housing 11 which encloses other meter components and the exterior of the housing 11 is free of such wires. The meter 10 may therefore be placed in a moist environment and even if the housing 11 is not watertight, the fact that there is external cable makes the meter 10 substantially tamper-proof. And when the meter 10 is used with a wireless (EME) system such as a cellular telephone 69 (or other type of telephone-like system) or a vehicle 63 carrying a transmitter 65 and receiver 67, the housing 11 is preferably made of a material, e.g., plastic or the like, which is permeable to EMR.

When the housing 11 is sealed and secured with non-removable fasteners or other means, it is not possible to enter the housing 11 without destroying the meter 10. This feature helps prevent tampering including efforts to bypass the meter 10 to avoid being billed for the commodity used.

Referring next to FIGS. 6, 7, 8 and 9 (and particularly to FIG. 6), another embodiment of the meter 10 is especially useful in areas where, as mentioned above, the meter 10 is mounted in a pit 75 below the ground level 77 of the earth 79. The conductor 15 carrying the metered commodity, e.g., water, has a portion 81 with a flow sensor 83 in it or associated with it. A turbine-type flow sensor 83 is represented but other types of such sensors are contemplated.

Such sensor 83 has an output device 85 providing a flow-related signal, i.e., a signal from which volumetric flow can be ascertained. In a specific embodiment, the output device 85 includes one or more magnets 87 attached to and rotating with a turbine.

The meter 10 has a sensing unit 89 in signal-sensing relationship to the output device 85 and the sensing unit 89 has a component for sensing the flow-related signal from such device 85. When the output device 85 includes a rotating magnet 87, the rate at which the standing electromagnetic field passes through a particular point is indicative of the rate at which the commodity is flowing through the conductor.

Therefore, when the output device 85 includes a rotating magnet 87, the "pickup" component 91 may be a Hall-effect transistor, for example. A Hall-effect transistor switches under the influence of a changing magnetic field and may be used to sense changes in the electromagnetic field of the magnet 87.

Figure 7:
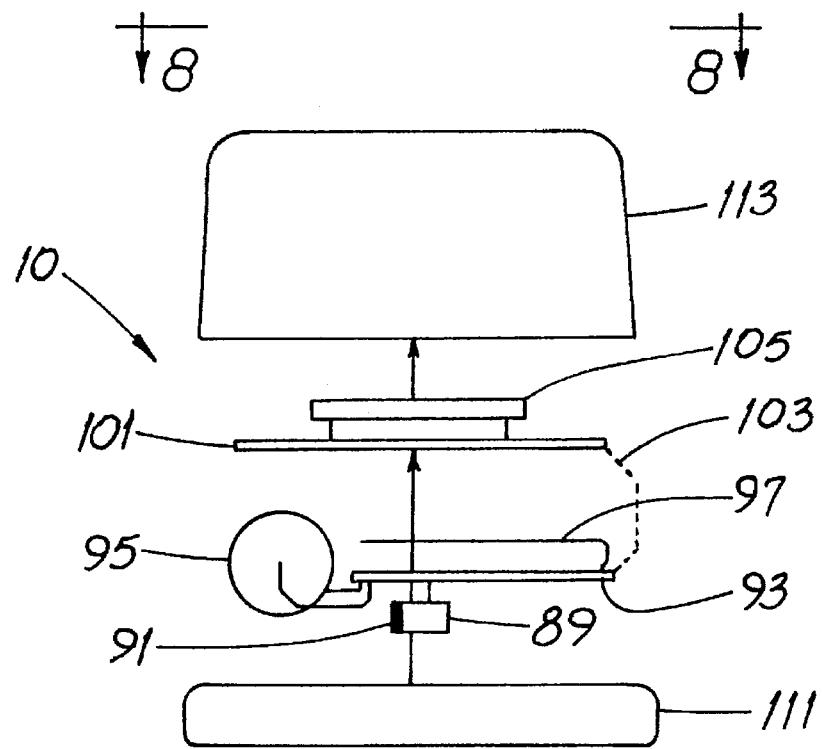
FIG. 7 is an exploded view of the meter shown in FIG. 6.

Referring particularly to FIG. 7, the meter 10 includes a printed circuit board 93 embodying an RF transceiver powered by a battery 95. A transceiver antenna 97 is connected to the board 93 and radiates RF energy from the transceiver. As described below, such antenna 97 also receives RF energy inductively-coupled thereto from a signal-radiating device 99.

Figure 8:
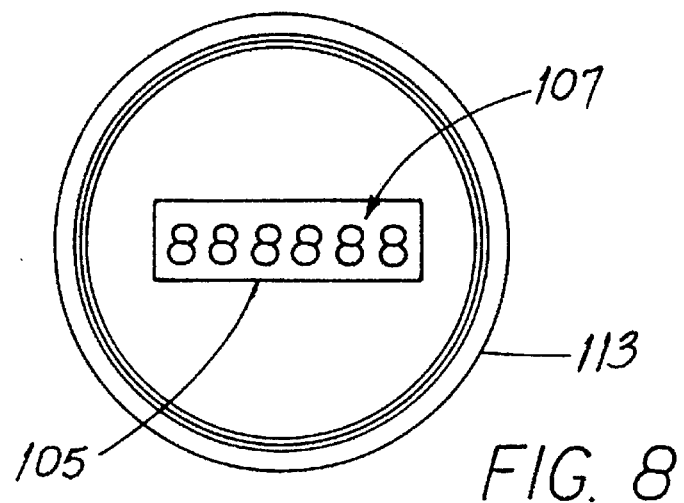
FIG. 8 is a top plan view of the meter shown in FIG. 7 taken along the viewing plane 8—8 thereof.

The meter 10 also has a count accumulator (i.e., totalizer) circuit board 101 connected to the board 93 by appropriate wiring 103. A liquid crystal display board 105 is connected to the circuit board 93. As shown in FIG. 8, the display board 105 has a digital indicator or readout 107 of the type illustrated in FIG. 2.

The transceiver board 93, battery 95, antenna 97, and boards 101 and 105 are all supported by and confined in a housing 109 comprising a meter base 111 and a top cover 113 sealing against such base 111. The housing 109 is watertight and at least the cover 113 of such housing 109 is preferably made of a material which is permeable to EMR.

Figure 9:
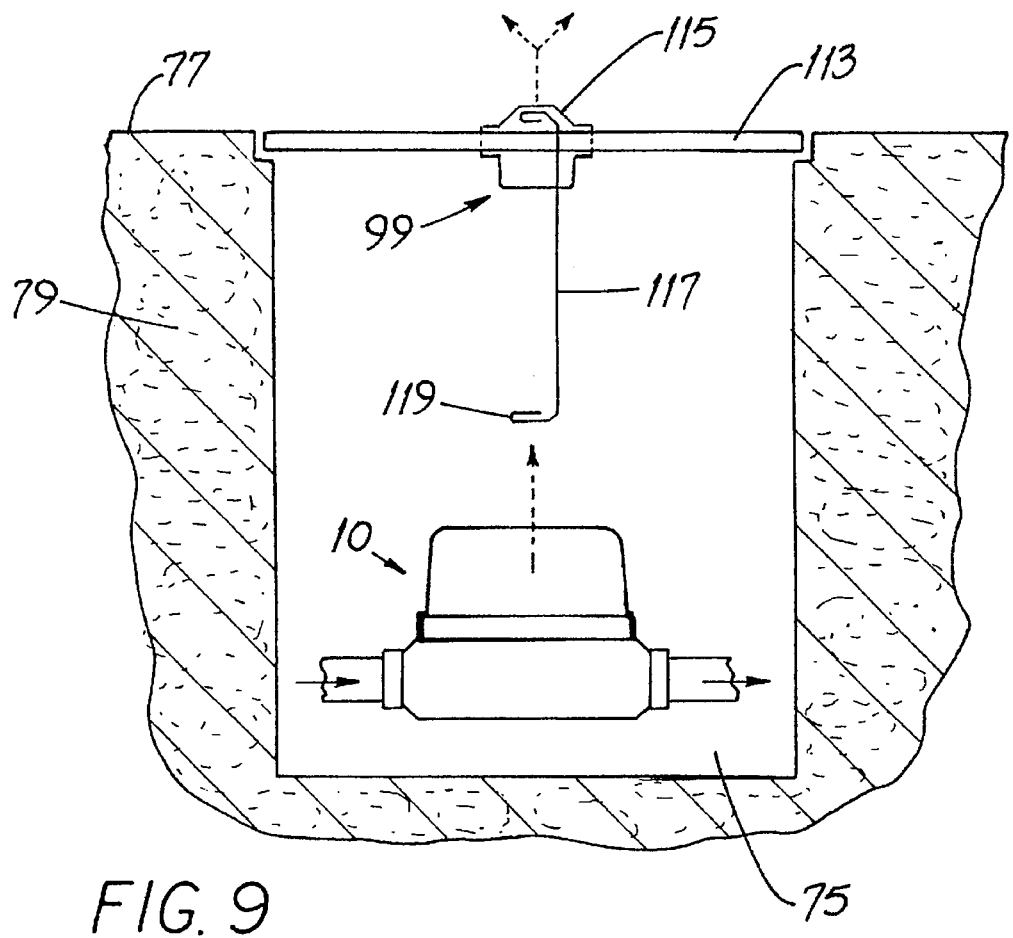
FIG. 9 is a cross-sectional side elevation view of the meter of FIG. 6 installed in a pit with a cover and a cover-mounted signal-radiating device.
Figure 6:
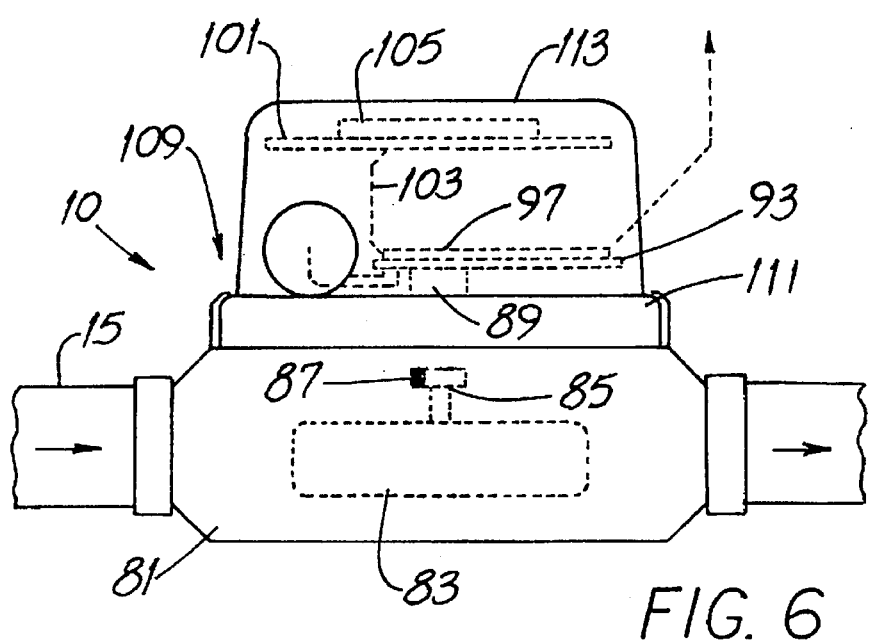
FIG. 6 is a side elevation view, partly in phantom, of another embodiment of the new meter shown in connection with a commodity-carrying conductor. Parts are broken away and surfaces of parts are shown in dashed outline.

Referring particularly to FIG. 9, the pit 75 has a cover 113 into which is fitted a signal-radiating device 99 such as a repeater antenna. Such device 99 has a radiating portion 115 above the cover 113 so that such cover 113 (which may be metal) does not interfere with electromagnetic radiation from and to the device 99.

More specifically, the signal-radiating device 99 includes a wire-like, electrically-conductive radiation "link" 117 extending downwardly from it. Such link 117 terminates in a signal-coupling loop 119 spaced from and in signal-coupling proximity to the transceiver antenna 97. In other words, the spatial relationship of the antenna 97 and the loop 119 is such that they are inductively-coupled to one another (and only inductively-coupled) rather than being connected by "hard" wiring.

The meter 10 is thereby free of wiring connecting the antenna 97 and the device 99 and the meter housing 109 may be readily sealed for water exclusion. Additionally, the pit cover 113 may be lifted and removed without disconnecting any wiring between the meter 10 and the device 99. Service time is thereby reduced. And the exterior of the meter housing 109 is free of wires carrying electricity. In other words, there are no wires passing between the housing interior and exterior. The housing 109 is substantially tamper-proof and readily made watertight for withstanding a moist environment or even immersion in water.

Figure 12:
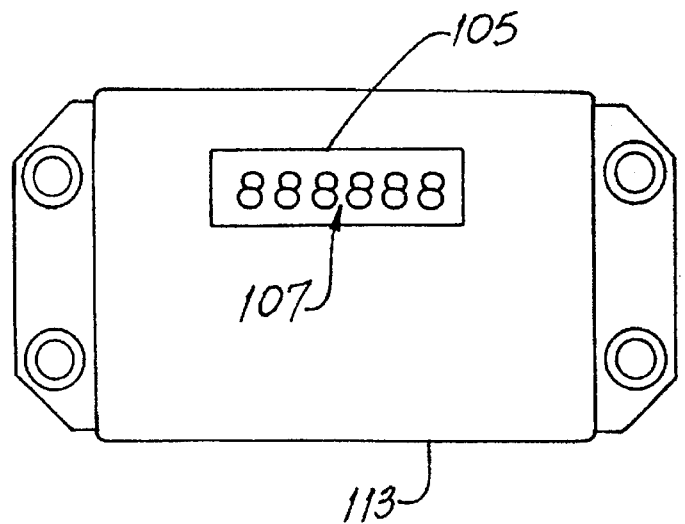
FIG. 12 is a front elevation view of the meter shown in FIG. 11 taken along the viewing plane 12—12 thereof.
Figure 11:
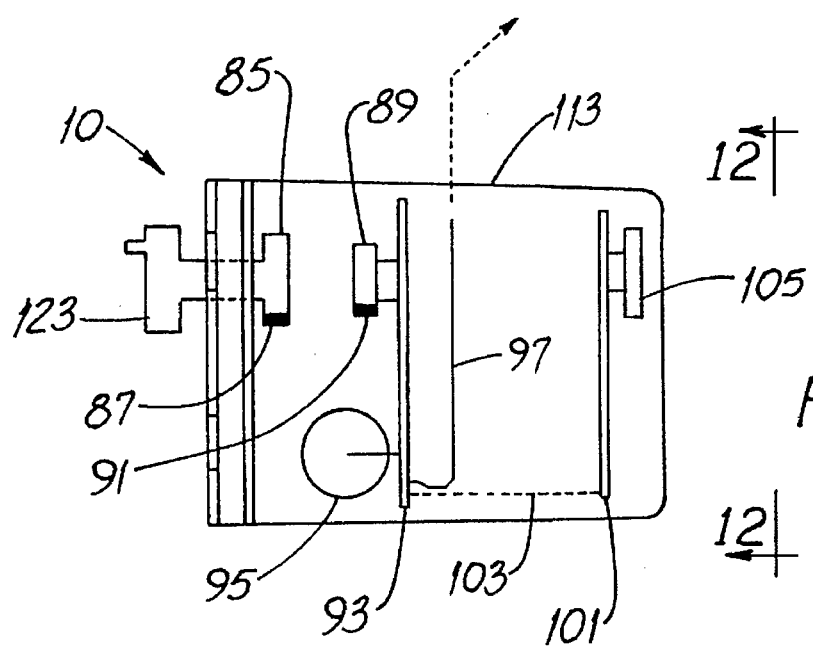
FIG. 11 is a phantom side elevation view of the meter shown in FIG. 10.
Figure 10:
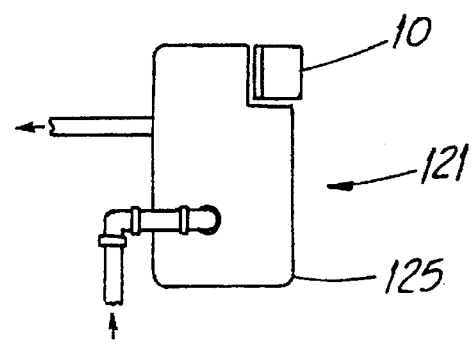
FIG. 10 is a representative side elevation view of yet another embodiment of the new meter shown in conjunction with a conventional gas meter enclosure. Parts are broken away.

Referring next to FIGS. 10, 11 and 12, a common type of gas meter 121 has a mechanical coupling 123 extending from the gas meter enclosure 125. In conventional usage, such coupling 123 is used to drive a mechanical analog readout dial.

Another embodiment of the new meter 10 is particularly useful for measuring volumetric consumption of a gaseous commodity flowing through the gas meter enclosure 125. The mechanical coupling 123 is equipped (as manufactured or by retrofit of a conventional gas meter) with an output device 85 providing a flow-related signal. Where the output device 85 includes a magnet 87, a component 91 of the meter sensing unit 89 may be a Hall-effect transistor as mentioned above. The availability of the mechanical coupling 123 on a conventional gas meter 121 and the ease with which the analog readout dial hardware can be removed makes this version of the meter 10 particularly attractive for retrofitting existing conventional gas meters 121.

Particularly in the meter embodiments shown in FIGS. 6-12, the transceiver board 93 and the totalizing circuit board 101 (as well as any other electrical circuitry) are preferably solid-state digital devices. Such devices, like the liquid crystal display 105, use very low power. And with such low power consumption, the new meter 10 operates for extended periods, even without using a rechargeable battery.

In use, the embodiments of the meter 10 shown in FIGS. 9 and 11 may be "interrogated" by a remotely-transmitted signal received by the antenna 97. In the embodiment of FIG. 9, such interrogating signal is first received by the radiating device 99 and is inductively-coupled to the antenna 97 through the link 117.

Thereupon, the transceiver board 93 is "triggered" and its responsive output signal (carrying encoded data from which consumption may be ascertained) is radiated from the antenna 97. In the embodiment of FIG. 9, such responsive output signal is inductively-coupled through the link 117 to the radiating portion 115 and thence to a receiver.

After analyzing the specification and the drawing, it will be appreciated that if the meter 10 is used to measure consumption of electricity, the battery 95 may not be required. And the flow sensor 83 may be other than a rotating turbine 13. Such embodiments are within the scope of the invention.

While the principles of the invention have been shown and described in connection with a few exemplary embodiments, it is to be understood clearly that such embodiments are exemplary and not limiting.

What is claimed is:

1. Apparatus for use with a meter measuring the flow of a commodity through a conductor, said apparatus providing radio frequency data communication to and from the antenna of a remote data transmitter/receiver, said apparatus being suitable for use with a meter located in a subsurface pit enclosure having an exposed pit lid and comprising:

a meter sensing unit couplable to the meter and positionable in the pit enclosure, said meter sensing unit having; a pick up unit in signal sensing relationship with the meter for obtaining a signal indicative of commodity flow through the conductor; a radio transceiver in communication with said pick up unit, said radio transceiver generating and receiving radio frequency signals; a first antenna coupled to said radio transceiver for radiating and receiving radio frequency signals; and a housing containing said pick up unit, said radio transceiver, and said first antenna, such that the exterior of said housing is free of conductors carrying electricity; and a second antenna mountable in the pit lid, said second antenna serving as a meter sensing unit relay antenna link, said second antenna having a first portion extending into the pit enclosure when said second antenna is mounted in the pit lid, said first portion being proximate to, but spaced from, said meter sensing unit for being inductively coupled to said meter sensing unit first antenna, said second antenna having a second portion positioned on the exterior of the pit lid when said second antenna is mounted in the pit lid, said second portion being coupled to said first portion for radiating and receiving radio frequency signals to and from the antenna of the remote data transmitter/receiver, wherein said second antenna comprising the relay antenna link provides a communication path between the meter sensing unit for the commodity flow measuring meter when positioned in the pit enclosure and the remote transmitter/receiver.

2. The apparatus according to claim 1 wherein said meter sensing unit housing is watertight and is permeable to electromagnetic radiation.

3. The apparatus according to claim 1 wherein said radio transceiver is further defined as generating and receiving radio frequency digitally encoded signal.

4. The apparatus according to claim 1 wherein said meter sensing unit has a visual indicator panel and a totalizing circuit board in said housing.

5. The apparatus according to claim 1 wherein the meter has a flow sensor including a magnet and wherein said pick up unit includes a component for sensing magnetic fields.

6. The apparatus according to claim 1 wherein the meter measures the flow of a gaseous commodity through the conductor and wherein said apparatus is further defined as suitable for use with a gaseous commodity flow measuring meter.

7. The apparatus according to claim 1 wherein the meter measures the flow of liquid commodity through the conductor and wherein said apparatus is further defined as suitable for use with a liquid commodity flow measuring meter.

8. Metering apparatus for measuring the flow of a commodity through a conductor and for providing radio frequency data communication to and from the antenna of a remote data transmitter/receiver, said metering apparatus being suitable for being located in a subsurface pit enclosure having an exposed pit lid and comprising:

a meter locatable in the pit enclosure and interposable in the conductor for measuring the flow of a commodity through the conductor;

a meter sensing unit coupled to said meter and positionable in the pit enclosure, said meter sensing unit having; a pick up unit in signal sensing relationship with said meter for obtaining a signal indicative of commodity flow through the conductor; a radio transceiver in communication with said pick up unit, said radio transceiver generating and receiving radio frequency signals; a first antenna coupled to said radio transceiver for radiating and receiving radio frequency signals; and a housing containing said pick up unit, said radio transceiver, and said first antenna, such that the exterior of said housing is free of conductors carrying electricity; and a second antenna mountable in the pit lid, said second antenna serving as a meter sensing unit relay antenna link, said second antenna having a first portion extending into the pit enclosure when said second antenna is mounted in the pit lid, said first portion being proximate to, but spaced from, said meter sensing unit for being inductively coupled to said meter sensing unit first antenna, said second antenna having a second portion positioned on the exterior of the pit lid when said second antenna is mounted in the pit lid, said second portion being coupled to said first portion for radiating and receiving radio frequency signals to and from the antenna of the remote data transmitter/receiver, wherein said second antenna comprising the relay antenna link provides a communication path between the meter sensing unit for the commodity flow measuring meter when located in the pit enclosure and the remote transmitter/receiver.

9. The metering apparatus according to claim 8 wherein said meter sensing unit housing is watertight and is permeable to electromagnetic radiation.

10. The metering apparatus according to claim 8 wherein said radio transceiver is further defined as generating and receiving radio frequency digitally encoded signal.

11. The metering apparatus according to claim 8 wherein said meter sensing unit has a visual indicator panel and a totalizing circuit board in said housing.

12. The metering apparatus according to claim 8 wherein the meter has a flow sensor including a magnet and wherein said pick up unit includes a component for sensing magnetic fields.

13. The metering apparatus according to claim 8 wherein said meter is a gaseous commodity flow measuring meter for measuring the flow of a gaseous commodity through the conductor.

14. The metering apparatus according to claim 8 wherein said meter is a liquid commodity flow measuring meter for measuring the flow of a liquid commodity through the conductor.

* * * * *